June 25, 1946. J. SIMPSON 2,402,687
STOP MOTION MECHANISM FOR DIE PRESSES
Filed June 12, 1944 3 Sheets-Sheet 3
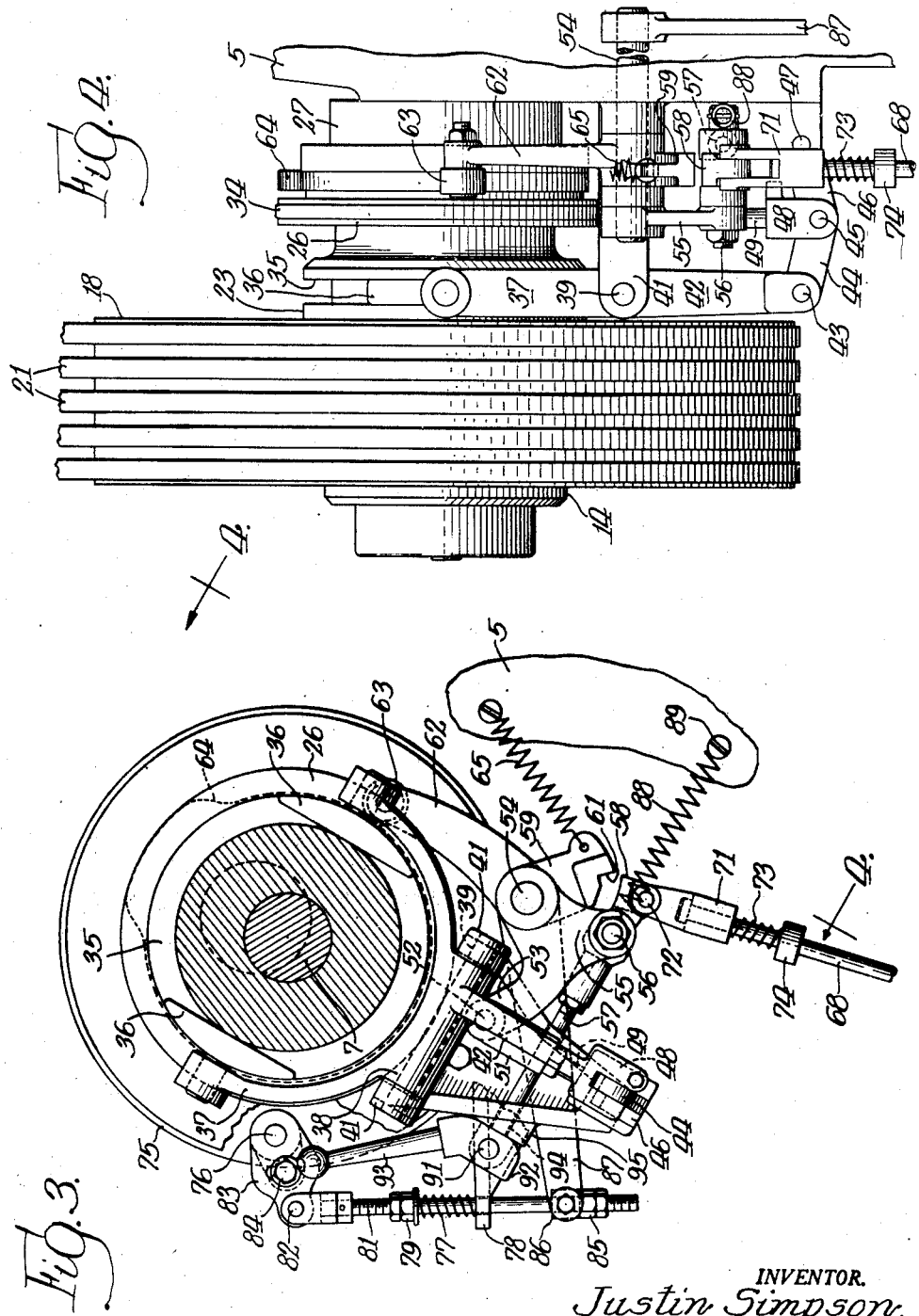
INVENTOR.
Justin Simpson.
BY
Ira J. Wilson
Atty.

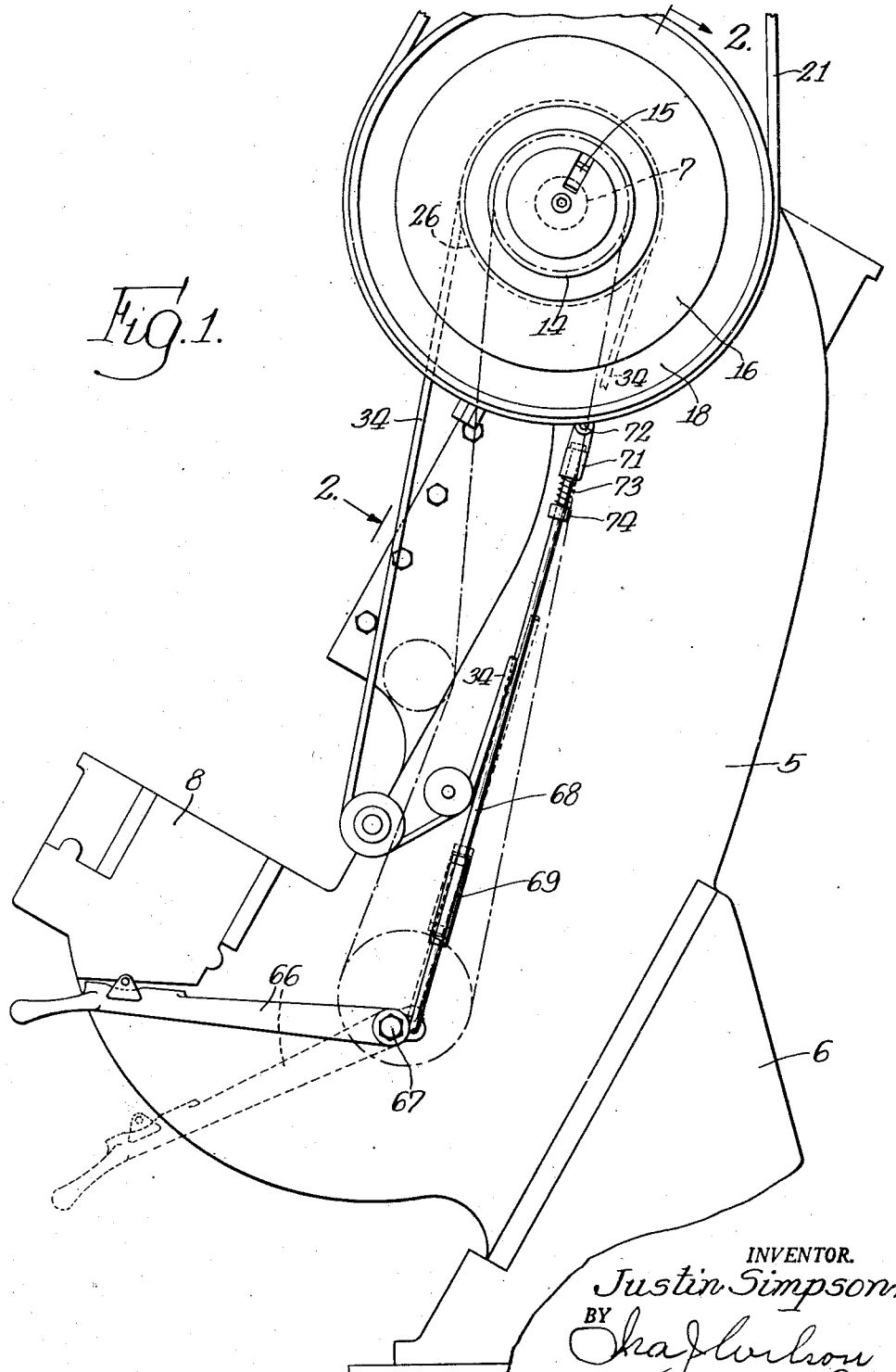

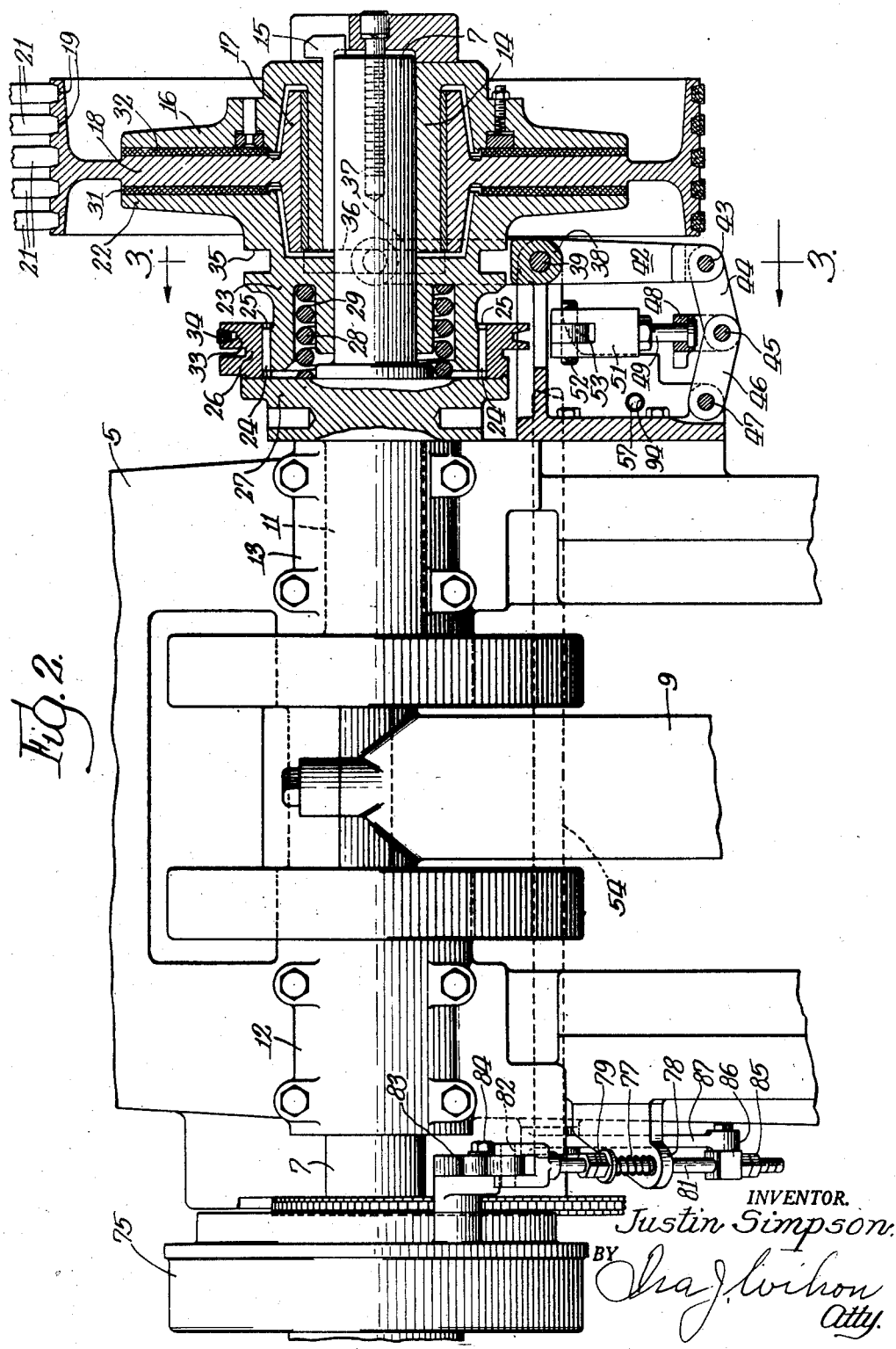

Patented June 25, 1946

2,402,687

UNITED STATES PATENT OFFICE 2,402,687

STOP MOTION MECHANISM FOR DIE PRESSES

Justin Simpson, Elmhurst, Ill., assignor to Cameron Can Machinery Company, Chicago, Ill., a corporation of Illinois Application June 12, 1944, Serial No. 539,809

6 Claims. (Cl. 192—144)

This invention relates to stop motion mechanisms capable of use on a variety of high speed machines, but particularly adapted for and here illustrated in connection with a high speed automatic die press.

One of the essentials of a stop motion mechanism when used on presses of this character is that it be adapted to bring the press to rest in a predetermined position with the movable die elevated so that access to both the movable and stationary dies may be readily had. A mechanism for this purpose is disclosed in Patent No. 2,330,555, issued to Cameron September 28, 1943. The mechanism in that patent embodied a brake and a clutch of the clutch-pin type, the clutch and brake being so timed that the press would be brought to rest in predetermined position and with the minimum of shock and jar.

My present invention constitutes an improvement upon the mechanism of the aforesaid patent in that the shocks and jars inherent in the employment of a clutch pin type of clutch, even when such clutch operates at its best, are entirely eliminated. This result is attained by employment of a friction clutch instead of a clutch-pin type, and the invention resides more specifically in the particular mechanism by which the clutch and brake are operated in predetermined timed relation to bring the press quickly and smoothly to rest in the desired position.

Other purposes and advantages of my invention will be readily appreciated from the following description when considered in connection with the accompanying drawings.

Referring to the drawings,

Fig. 1 is a side elevation, somewhat schematic in character, of a press equipped with my invention;

Fig. 2 is a fragmentary elevation partially in section and looking toward the right in the direction of the arrow on Fig. 1;

Fig. 3 is a sectional view on the line 3—3 of Fig. 2; and

Fig. 4 is a rear elevation of the clutch side of the machine looking at Fig. 3 substantially on the line 4—4.

Referring to the drawings more in detail, reference character 5 indicates the body of the machine which is supported upon the base 6 and carries the main shaft 7. A stationary die 8 is mounted on the frame, and a movable die, not shown, is reciprocal toward and from the stationary die by the connecting rod 9 which is connected at its upper end to the crank 11 formed intermediate the ends of the shaft 7. The shaft is journaled in bearings 12 and 13 and is equipped at one end with a driving clutch and at its other end with a brake, both of which will be later more fully described.

From Fig. 2 it will be observed that a cylindrical hub 14 is keyed to the shaft near one end by the spline key 15 and is shaped to provide an external clutch disc 16 secured to and preferably formed integrally with the hub 14. Upon the cylindrical hub 14 there is rotatably mounted the hub 17 of a driving clutch disc 18 formed at its perimeter to serve as a flywheel and also as a driving wheel, which in the present instance is shown as being grooved on its periphery, as indicated at 19, for the reception of driving V-belts 21.

A second external clutch disc 22 is formed upon one end of a clutch sleeve 23 rotatably mounted upon the shaft 7 and slidably connected by splines 24 seated in grooves 25 to a ring 26 which is fixedly attached to an annular shoulder 27 formed on the shaft 7 in close proximity to the bearing 13. A coiled expansion spring 28 interposed between the outer face of shoulder 27 and the bottom of a groove 29 formed in the clutch sleeve 23, normally urges the sleeve and clutch disc 22 toward the right viewing Fig. 2 into clutching relation with the driving disc 18. Discs 31 and 32 of clutch lining material are interposed between the faces of the driving disc 18 and the driven discs 16 and 22, respectively. A peripheral groove 33 formed in the ring 26 is designed to receive a V-belt 34 by which the scrap, feed and delivery rolls (not shown) are driven.

Hub 23 of the disc 22 is also provided with a peripheral groove 35 in which a pair of shoes 36 carried by the respective arms of a yoke 37 are slidably disposed. The hub 38 of this yoke is fulcrumed on a pintle 39 carried in bearings 41 formed on the frame of the machine. The depending arm 42 of this yoke is connected at its lower end by a pin 43 with a link 44 pivotally connected by a pin 45 with a similar link 46 pivoted at 47 to the machine frame, the links 44 and 46 together forming a toggle by which the yoke 42 is moved counter-clockwise on its pintle 39 to withdraw clutch disc 22 from the driving disc 18 against the force of spring 28 when the toggle is straightened or, in other words, when the pin 45 is moved upwardly into alignment with pins 43 and 47. A yoke 48 straddling links 44 and 46 and engaged with pin 45 is connected with a link 49 which is adjustably connected with a bifurcated head 51, which in turn is connected by a pin 52 with the lateral arm of a bell-crank lever 53 fixed upon a shaft 54 and including a depending arm 55 to which, by means of a bolt 56, one end of an adjustable link 57 and an adjustable abutment dog 58 are pivotally mounted. Upon the shaft 54 there is rotatably mounted a bell-crank lever consisting of a downwardly extending abutment arm 59 provided with an abutment shoulder 61 and an upwardly extending arm 62 provided with a cam follower 63 which is retained in cooperative relation with a cam 64 by means of a tractile spring 65 attached at one end to the arm 59 and at its other to the frame 5.

The press is provided with a starting handle 66 pivoted on the frame at 67 and adapted to be retained in the starting and running position exemplified in full lines in Fig. 1, by electromagnetic means controlled by an electric circuit or circuits including suitable stop switches by which the circuit will be broken to release the handle upon the occurrence of certain predetermined abnormalities in the operation of the press. The electrical means may be of the general type disclosed in prior Patent No. 2,330,555 previously referred to, or may be of modified form to suit the requirements of any particular installation, as is well known in the art. The operating end of the handle 66 is connected by a link 68, preferably including an adjustable turnbuckle, 69, with the head 71 of the pivoted dog 58, said head being pivotally connected to the dog by pivot pin 72. An expansion spring 73 interposed between said head and a shoulder 74 on the link 68 affords a yieldable connection which prevents injury to the parts in the event the arm 59 should be disposed in the path of the dog 58 when an upward thrust is exerted thereon.

The left-hand end of the shaft 7 is equipped, as previously mentioned, with a brake which may be of any desired construction, but preferably is of the type illustrated in previously mentioned Patent No. 2,330,555. The details of the brake structure need not here be explained in detail, but it will be sufficient to state that within the stationary brake drum 75 there is disposed an expansible brake band or shoe adapted to be expanded into braking engagement with the drum when the stub shaft 76 (upon the inner end of which the brake expanding device is mounted) is partially rotated in a clockwise direction viewing Fig. 3. This movement is imparted by a spring 77 interposed between a bracket 78 on the frame of the machine and an adjustable abutment 79 mounted upon a rod 81 connected by a pin 82 to an arm 83 adjustably connected with shaft 76 by a bolt and slot connection 84. The lower end of rod 81 is equipped with an adjustable abutment 85, and an eye 86 slidably disposed upon that portion of the rod beneath the bracket 78 is connected with an arm 87 which is fixed upon the end portion of shaft 54 extending transversely of the machine, as will be apparent from Fig. 2. A tractile spring 88 (Fig. 3), connected with bolt 56 and a post 89 on the frame 5, normally holds the shaft 54 with the lever arm 87 and the bell-crank lever 53 fixed thereon in the position shown in Fig. 3, so that arm 87 holds the brake rod 81 down with the brake band in inoperative relation to the surrounding brake drum. When shaft 54 is moved in a clockwise direction to elevate the end of arm 87, brake rod 81 is thrust upwardly by the spring 77, thereby applying the brake so as to stop the rotation of shaft 7.

In order that the brake may be applied and retained to hold the shaft against rotation under the weight of the upper die and connecting rod when the press is stopped, I have provided means for manually actuating the rockshaft 54 and the parts connected therewith. This means consists of the previously mentioned link 57 connected at one end to the bolt 56 and pivotally connected at its other end by a pin 91 with a cam head 92 provided with a hand lever 93. The link projects through an opening 94 in a bracket 95 projecting from the main frame of the machine. It will be apparent that swinging movement of the lever 93 upon its pivot 91 in a counter-clockwise direction viewing Fig. 3 will pull the link 57 to the left, thereby rocking the lever 53, the rockshaft 54 and the arm 87 in a clockwise direction to apply the brake and release the clutch.

During normal operation of the press the disc flywheel 18 is driven from any suitable source of power, preferably an electric motor, by means of the V-belt drive 21. The handle 66 is in the running position shown in full lines in Fig. 1, the clutch discs 16 and 22 are held in driving engagement with the driving disc 18 by the spring 28, and the brake is held in off position by the arm 87, all as shown in the drawings. Upon release of the handle 66 by either manual manipulation or through the occurrence of an abnormality in the operation of the press, the handle assumes the dotted line position shown in Fig. 1, thereby elevating the dog 58 into the path of the abutment shoulder 61 on the lever arm 59. When the high portion of the cam 64 engages the follower 63, rocking the lever arm 62 in a clockwise direction viewing Fig. 3, the shoulder 61 pushes the abutment dog 58 to the left, thereby rocking the lever 53 in a clockwise direction to release the clutch by straightening the toggle consisting of the links 44 and 46 so as to swing clutch lever 42 in a counter-clockwise direction (Fig. 2). At the same time the cross-shaft 54 is rocked in a clockwise direction viewing Fig. 3 to raise the arm 87, thereby permitting the spring 77 to apply the brake so as to bring the shaft 7 to a stop. The stopping of the press is thus effected before the cam follower 63 rides off the high portion of the cam 64, in which position of the shaft 7 the upper die is in elevated position. When it is desired to start the press again, the handle 66 is manually raised to running position, thereby withdrawing the dog 58 from the shoulder 61, thus permitting the brake to be released under the influence of spring 88 and the clutch to be engaged by the spring 23.

In the event that in working upon the press it should be desirable to turn it by hand to a point where the high part of the cam 64 would pass beyond the follower 63, the shaft 7 may be locked against rotation under the weight of the upper die by simply swinging the hand lever 93 in a counter-clockwise direction, viewing Fig. 3, to thereby manually apply the brake in the manner previously described.

While I have shown and described a preferred embodiment of my invention, it should be manifest that the structural details illustrated and described may be varied within considerable limits without departing from the essence of my invention as defined in the following claims.

I claim:

1. The combination with a die press including a main shaft, a friction driving clutch therefor, a brake therefor and a start and stop handle, of a rockshaft extending parallel with said shaft, a clutch controlling lever and a brake controlling arm fixed on said rockshaft in spaced apart relation, a cam on said main shaft, a lever operable by said cam and provided with an abutment shoulder, a thrust dog connected to move said rockshaft under the influence of said abutment shoulder, a connection between said thrust dog and said start and stop handle for moving said thrust dog into and out of cooperative relation with said abutment shoulder and an operating connection between said clutch controlling lever and said clutch including a clutch shifting yoke, a pair of pivotally connected toggle links interposed between said yoke and a stationary point on the press and an operating link connecting said toggle links with said clutch controlling lever.

2. The combination with a die press or the like including a main shaft, a clutch and a brake therefor, of a rockshaft, means operable by said shaft for actuating said clutch and brake, a manually operable means for rocking said shaft, and manually controlled means including a cam actuated lever, a thrust dog and a start and stop handle connected with said dog for operating said rockshaft under the control of said handle.

3. The combination with a die press including a main shaft, a brake and a clutch therefor, and a start and stop handle, of a rockshaft, operative connections between said shaft and said brake and clutch, manually controlled means including a manually operable cam for rocking said shaft, and automatically operable means for operating said shaft, including a cam, a lever provided with an abutment shoulder, a thrust dog and a connection between said dog and said handle whereby the dog may be positioned in and withdrawn from the path of movement of said shoulder.

4. The combination with a die press or the like having a main shaft, a friction driving clutch positioned near one end of said shaft and a brake for said shaft positioned near the other end thereof, of a rockshaft extending parallel with said main shaft, a cam on said main shaft, an oscillatory lever operable by said cam and provided with a thrust shoulder, a clutch controlling lever fixed on said shaft, a thrust dog pivoted on said clutch controlling lever, means for positioning said dog in the path of said shoulder to thereby cause said rockshaft to be actuated from said cam, a brake controlling arm fixed on said rockshaft, brake actuating mechanism controlled by said arm, a clutch shifting yoke, and a connection between and yoke and said clutch controlling lever including a toggle and an operating link connected with said lever whereby said clutch is released upon actuation of said rockshaft.

5. The combination in a stop motion mechanism for die presses and the like including a main shaft, a friction driving clutch and a brake therefor, of a rockshaft, a cam on said main shaft, a lever fulcrumed on the rockshaft to be actuated from said cam, an abutment shoulder carried by said lever, a clutch controlling lever fixed on said rockshaft, a thrust dog pivoted on said last mentioned lever, means for positioning said dog in the path of said shoulder, a link connected with one arm of said clutch controlling lever, a toggle connected to be actuated by said link, a yoke lever for shifting said clutch under the influence of said toggle, a brake controlling arm fixed on said rockshaft, a spring actuated brake rod, and a lost motion connection between said rod and said last mentioned arm.

6. The combination with a die press or the like including a main shaft, a clutch and a brake therefor, and a cam on said shaft, of a rockshaft disposed parallel with the main shaft, a lever fulcrumed on said rockshaft and adapted to be operated by said cam, a shoulder carried by said lever, a clutch controlling lever fixed on said rockshaft, a thrust dog pivoted on said clutch controlling lever, means for positioning said dog in the path of said shoulder, a clutch shifting yoke, means including a link and a toggle connecting said yoke to said clutch controlling lever whereby said yoke is actuated, a brake controlling arm fixed on said rockshaft, a brake operating rod, a lost motion connection between said rod and said arm, and manually operable means for actuating said rockshaft.

JUSTIN SIMPSON.